(12) United States Patent
Rashad et al.

(10) Patent No.: US 11,848,756 B1
(45) Date of Patent: Dec. 19, 2023

(54) AUTOMATIC DETECTION OF OPTIMAL NETWORKING STACK AND PROTOCOL

(71) Applicant: International Business Machines Corporation, Armonk, NY (US)

(72) Inventors: Kaji Rashad, Morrisville, NC (US); Aaron Ye Li, Morrisville, NC (US); Al Chakra, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/186,695

(22) Filed: Mar. 20, 2023

(51) Int. Cl.
*H04L 41/0823* (2022.01)
*H04L 69/24* (2022.01)
*G06N 20/00* (2019.01)

(52) U.S. Cl.
CPC ......... *H04L 41/0823* (2013.01); *G06N 20/00* (2019.01); *H04L 69/24* (2013.01)

(58) Field of Classification Search
None
See application file for complete search history.

(56) References Cited

U.S. PATENT DOCUMENTS

| | | | |
|---|---|---|---|
| 5,999,979 A | 12/1999 | Vellanki et al. | |
| 7,325,037 B2 | 1/2008 | Lawson | |
| 8,484,695 B2 | 7/2013 | MacKinnon et al. | |
| 8,601,143 B2 | 12/2013 | Vogel, Jr. et al. | |
| 8,798,016 B2 | 8/2014 | Hopkins | |
| 9,769,070 B2 | 9/2017 | Basunov | |
| 10,050,862 B2 | 8/2018 | Nambiar et al. | |
| 10,075,351 B2 | 9/2018 | Morrill | |
| 10,608,995 B2 | 3/2020 | Chou et al. | |
| 11,076,027 B1* | 7/2021 | Sharp | H04L 41/022 |
| 11,108,632 B1 | 8/2021 | Srinivasan et al. | |
| 11,216,202 B1 | 1/2022 | Srinivasan et al. | |
| 11,321,142 B2 | 5/2022 | Srinivasan et al. | |
| 2014/0372769 A1 | 12/2014 | Kerschbaum et al. | |
| 2019/0268421 A1 | 8/2019 | Markuze et al. | |
| 2021/0075892 A1* | 3/2021 | Chun | H04L 69/163 |
| 2021/0144095 A1 | 5/2021 | Hanes et al. | |

FOREIGN PATENT DOCUMENTS

| | | | | |
|---|---|---|---|---|
| DE | 102019217463 A1 * | 5/2021 | | H04L 67/12 |
| EP | 1150471 A2 | 10/2001 | | |

OTHER PUBLICATIONS

Machine translation of DE-102019217463-A1 (Year: 2021).*

(Continued)

*Primary Examiner* — Angela Nguyen
(74) *Attorney, Agent, or Firm* — Patterson + Sheridan, LLP (57) ABSTRACT

Techniques and apparatus for optimizing communications between computing devices are described. An example technique includes determining one or more parameters of a communication between a first computing device and a second computing device. At least one of a networking stack or a communication protocol that will meet a target set of criteria for the communication is predicted, based on evaluating the one or more parameters with at least one machine learning model. An indication of at least one of the networking stack or the communication protocol is transmitted.

20 Claims, 8 Drawing Sheets

(56) References Cited

OTHER PUBLICATIONS

Kumar, Ashwin, et al. "Evaluating network stacks for the virtualized mobile packet core." 5th Asia-Pacific Workshop on Networking (APNet 2021). 2021.

Wondracek, Gilbert, et al. "Automatic Network Protocol Analysis." NDSS. vol. 8. 2008.

Yasukata, Kenichi, et al. "Stackmap: low-latency networking with the {OS} stack and dedicated nics." 2016 {USENIX} Annual Technical Conference ({USENIX}{ATC} 16). 2016.

Authors et al., "Determining Priority Value of Processes Based on Usage History," ip.com, IP.com No. IPCOM000252344D Dated Jan. 5, 2018, pp. 1-39.

Authors et al., "Collecting and visualizing a service's frame stack transformation across a multi-layer network," ip.com, IP.com No. IPCOM000264032D, Dated: Nov. 2, 2020, pp. 1-9.

Authors et al., "Method and System for Automated Inter-Network Hoplet Detection and Correction," ip.com, IP.com No. IPCOM000264332D, Dated: Dec. 3, 2020, pp. 1-5.

\* cited by examiner

| WORKLOAD | SAVINGS: DELAY | INTRA-CPC | PROTOCOL |
|---|---|---|---|
| STR | YES | YES | SMC-D (1) |
| RR | YES | YES | SMC-D (1) |
| CRR | NO | YES | 0 |
| ... | ... | ... | ... |
| ... | | | |

AUTOMATIC DETECTION OF OPTIMAL NETWORKING STACK AND PROTOCOL

BACKGROUND

The present disclosure generally relates to computer networking, and more specifically, to techniques for optimizing communications between computing devices.

Today, datacenters (or data centers) are used to process a vast amount of data. A datacenter is generally a facility that includes infrastructure for storing, processing, and forwarding data and applications. For example, a datacenter may include thousands of internal nodes (e.g., servers) to perform certain storing, processing, and forwarding operations. In such datacenters, many of these nodes may use the same networking stack, which determines the operation efficiency. In many cases, however, one networking stack may be superior to another networking stack for a specific type of workload (e.g., transaction). As such, using the same networking stack for all workloads may negatively impact the performance of the datacenter.

SUMMARY

One embodiment described herein is a computer-implemented method. The computer-implemented method includes determining one or more parameters of a communication between a first computing device and a second computing device. The computer-implemented method also includes predicting at least one of a networking stack or a communication protocol that will meet a target set of criteria for the communication, based on evaluating the one or more parameters with at least one machine learning model. The computer-implemented method further includes transmitting an indication of at least one of the networking stack or the communication protocol.

Another embodiment described herein is a system. The system includes a processor and a memory. The memory includes a computer program product configured to perform an operation. The operation includes determining one or more parameters of a communication between a first computing device and a second computing device. The operation also includes predicting at least one of a networking stack or a communication protocol that will meet a target set of criteria for the communication, based on evaluating the one or more parameters with at least one machine learning model. The operation further includes transmitting an indication of at least one of the networking stack or the communication protocol.

Another embodiment described herein includes a computer-readable storage medium having computer-readable program code embodied therewith. The computer-readable program code is executable by one or more computer processors to perform an operation. The operation includes determining one or more parameters of a communication between a first computing device and a second computing device. The operation also includes predicting at least one of a networking stack or a communication protocol that will meet a target set of criteria for the communication, based on evaluating the one or more parameters with at least one machine learning model. The operation further includes transmitting an indication of at least one of the networking stack or the communication protocol.

DETAILED DESCRIPTION

Embodiments described herein provide techniques for optimizing communications between network devices in a datacenter. In one embodiment described herein, an optimization component is configured to evaluate a network connection between network devices within a data center and determine one or more parameters associated with the network connection. Such parameters may include, for example, network-related parameters (e.g., data size, latency, throughput, processor load, communication protocol, etc.), non-network related parameters (e.g., encryption strength, application type, etc.), or a combination of network related parameters and non-network related parameters.

The optimization component can determine at least one of an optimal networking stack or communication protocol for the network devices to use for communication, based at least in part on the parameters. As used herein, the "optimal" networking stack/communication protocol generally refers to a communication protocol that meets a target or desired set of criteria for the network communication. For example, short lived connections (e.g., connect-request-response (CRR) communications) are generally suited for transmission control protocol/internet protocol (TCP/IP), while long lived flows that transfer large amounts of data (e.g., streaming applications) may be suited for shared memory communications (SMC). In general, the optimization component may predict the networking stack and/or communication protocol that will maximize operation efficiency, maximize latency reduction, minimize processor overhead, or a combination thereof.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Figure 1A:
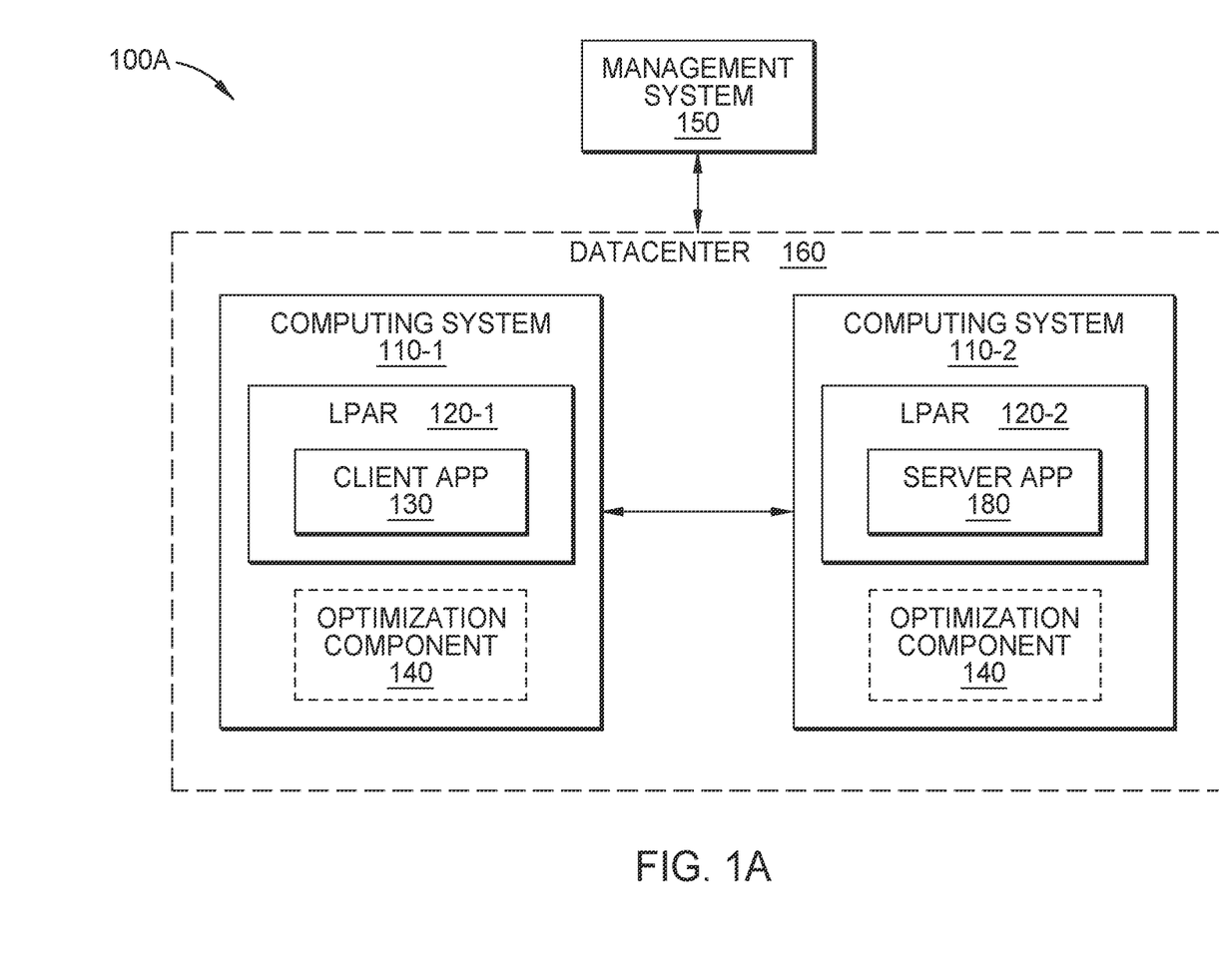
FIG. 1A illustrates an example computing environment, according to one embodiment.

FIG. 1A illustrates an example computing environment 100A, according to one embodiment. The computing environment 100A includes a datacenter 160, which includes a computing system 110-1 and a computing system 110-2. The datacenter 160 generally operates under the control of a management system 150, which can include hardware components, software components, or combinations thereof. For example, the management system 150 may be representative of a variety of computing systems, such as a laptop, server, desktop, etc.

The computing systems 110 1-2 are representative of mainframe computers, which generally refers to the physical collection of hardware that includes storage, one or more processors, timers, channels, and other system components. The computing system 110-1 may communicate with the computing system 110-2, and vice versa. Here, the computing system 110-1 includes a logical partition (LPAR) 120-1, which hosts a client application 130, and the computing system 110-2 includes a LPAR 120-2, which hosts a server application 180. In some embodiments, the client application 130 may communicate with the server application 180 using a communication protocol, such as TCP/IP, SMC, or another communication protocol.

In some cases, however, when the client application 130 is communicating with the server application 180, the client application 130 and server application 180 may use a communication protocol that is non-optimal for the particular communication. For example, depending on the workload, the client application 130 and server application 180 may use a communication protocol that leads to higher latency, higher processing overhead, or a combination thereof. As a reference example, using TCP/IP to communicate large amounts of traffic, can impact the performance of the computing systems 110 1-2, and in turn, the performance of the datacenter 160.

To address this, certain embodiments herein use an optimization component 140 to analyze the workload being executed by the computing systems 110 1-2 and predict at least one of an optimal networking stack or a communication protocol to meet a set of target criteria (e.g., maximizing latency reduction, minimizing processor overhead, etc.). The optimization component 140 may be located within the computing system 110-1, within the computing system 110-2, or within the computing system 110-1 and computing system 110-2. The optimization component 140 may transmit an indication of at least one of the optimal networking stack or the optimal communication protocol to a network administrator via the management system 150. Note, the optimization component 140 is described in greater detail herein.

Figure 1B:
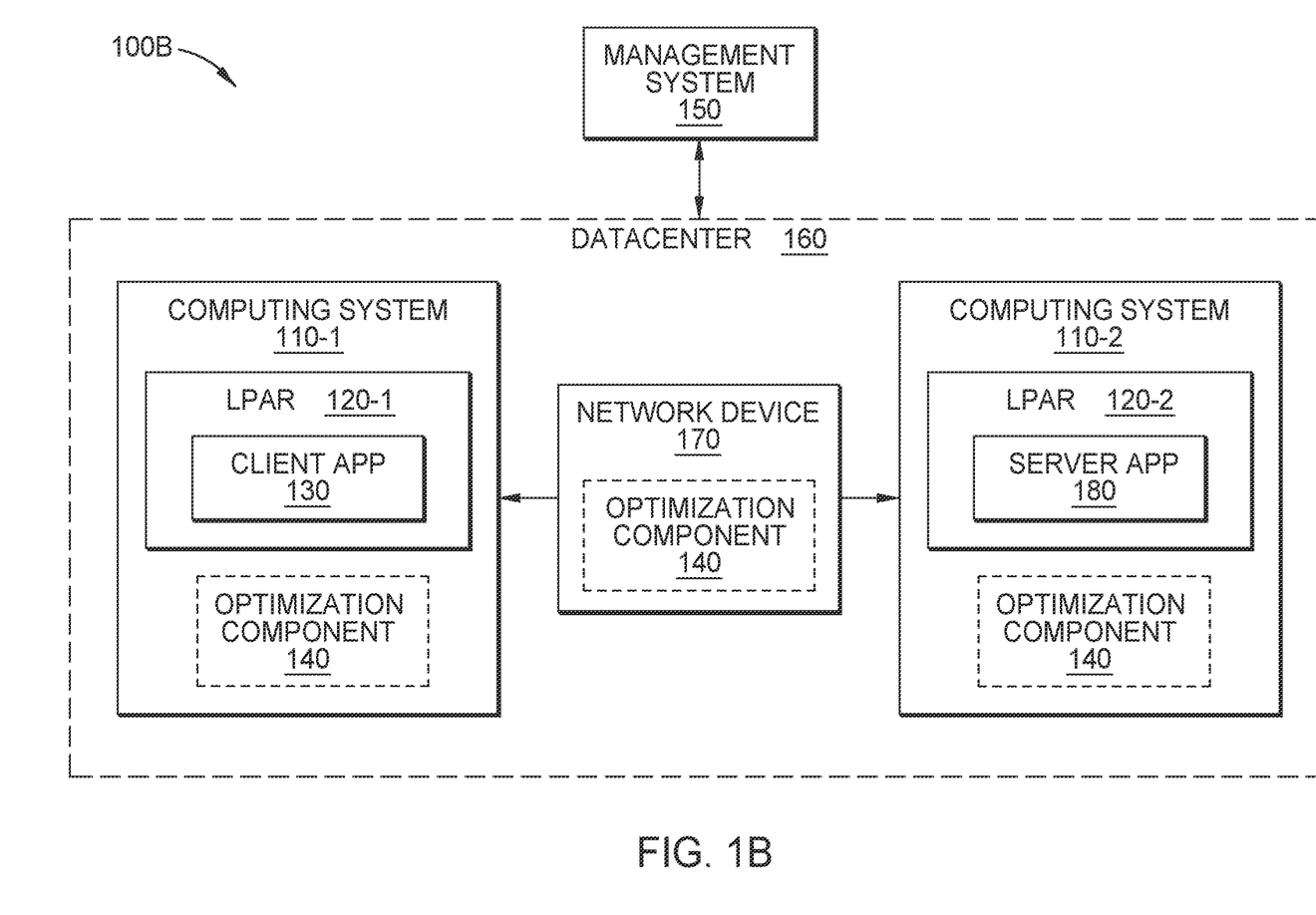
FIG. 1B illustrates another example computing environment, according to one embodiment.

Note that FIG. 1A illustrates merely a reference example computing environment and that other embodiments of the computing environment can also be configured to predict an optimal networking stack and/or communication protocol for communication between computing devices (e.g., client to server, server to server, etc.) within a datacenter 160. By way of example, FIG. 1B illustrates another computing environment 100B, which includes a network device 170 within the datacenter 160. The network device 170 is generally representative of a router, switch, or other network component that can forward traffic to and from computing systems 110. As shown in FIG. 1B, in one embodiment, the network device 170 includes an optimization component 140, which can predict an optimal networking stack and/or communication protocol for forwarding traffic between the computing system 110-1 and the computing system 110-2. Further details regarding an example computing environment in which the techniques described herein can be implemented are described below with respect to FIG. 8.

Figure 2:
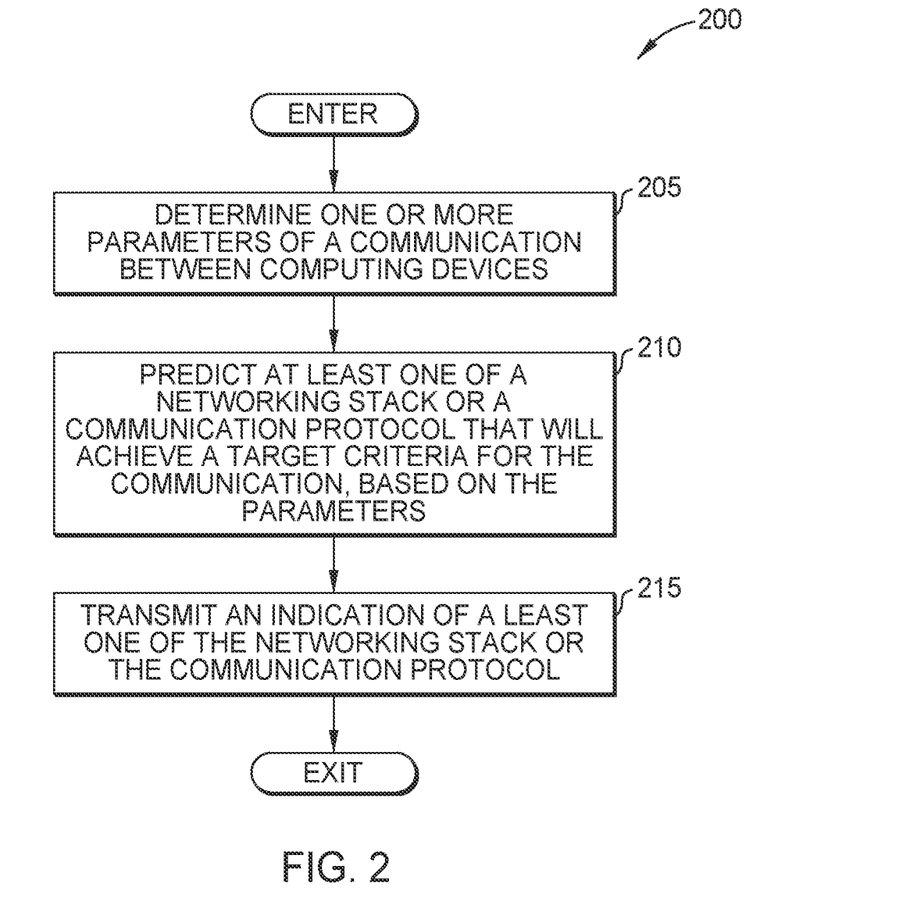
FIG. 2 is a flowchart of a method for optimizing network communication between computing systems, according to one embodiment.

FIG. 2 is a flowchart of a method 200 for optimizing communications between computing systems 100, according to one embodiment. The method 200 may be performed by an optimization component (e.g., optimization component 140).

Method 200 enters at block 205, where the optimization component determines one or more parameters of a communication between computing devices (e.g., computing systems 110-1 and 110-2). The parameter(s) may include network-related parameters, non-network related parameters, or a combination of network-related parameters and non-network related parameters. Examples of network-related parameters can include, but are not limited to, a communication protocol, data size, processor load, and latency. Examples of non-network related parameters can include, but are not limited to, encryption strength, encryption type, and application type.

At block 210, the optimization component predicts at least one of a networking stack or a communication protocol that will achieve a target set of criteria for the communication, based on the parameters. In one embodiment described herein, the optimization component may evaluate the parameters using one or more decision tree models to determine the networking stack and/or communication protocol. At block 215, the optimization component transmits an indication of at least one of the networking stack or the communication protocol to another computing device, such as the management system 150. The management system 150 may be used by a network administrator or operator. In certain embodiments, the network administrator may use the management system 150 to configure the computing devices to use at least one of the predicted networking stack or the predicted communication protocol.

Figure 3:
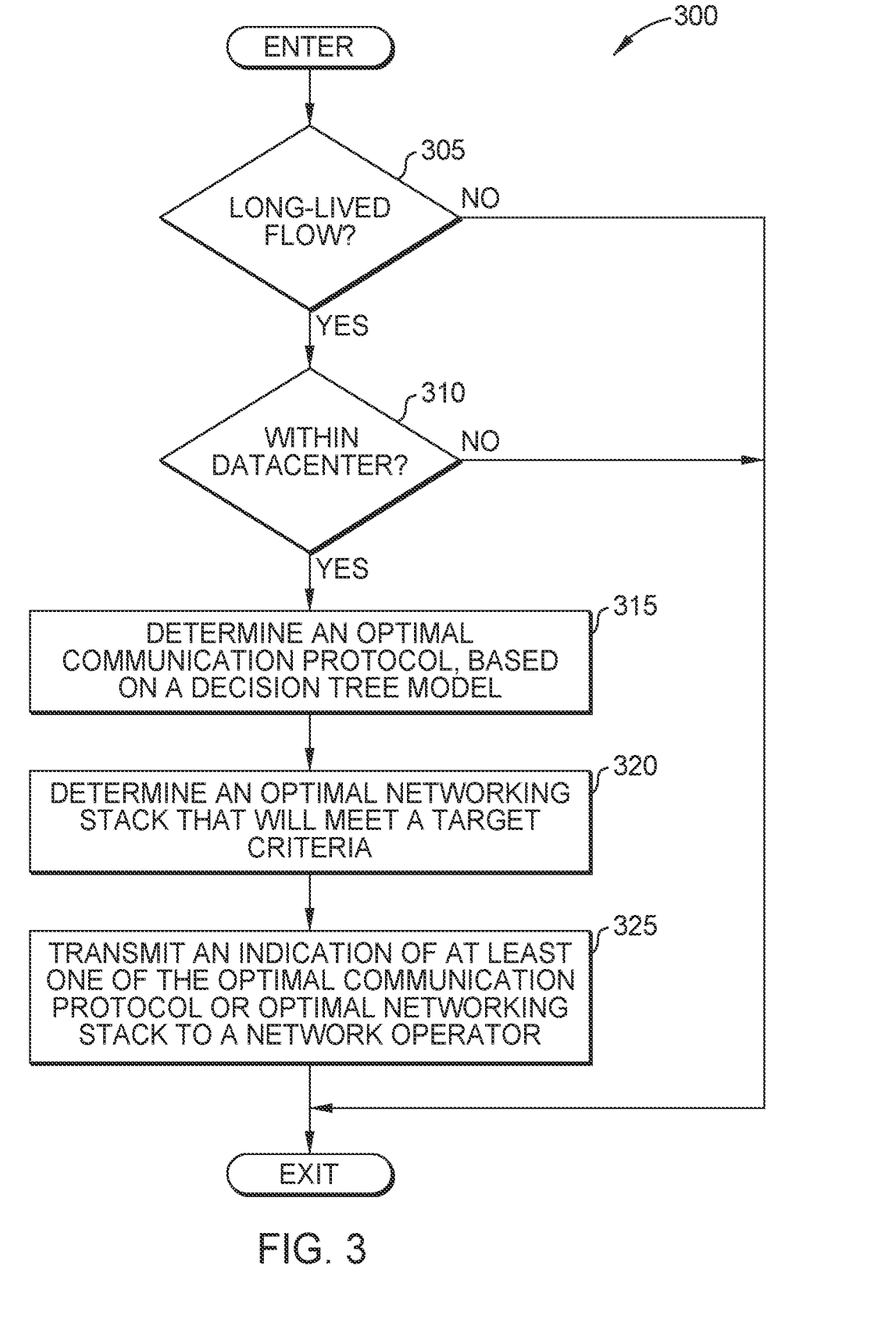
FIG. 3 is a flowchart of another method for optimizing network communication between computing systems, according to one embodiment.

FIG. 3 is a flowchart of a method 300 for optimizing communications between computing systems 100, according to one embodiment. The method 300 may be performed by an optimization component (e.g., optimization component 140). In one embodiment, method 300 may assume that (i) the client (e.g., client application 130) and server (e.g., server application 180) are currently communicating using a TCP/IP stack, (ii) the amount of hops is "1" (e.g., indicating that the client/server are in a datacenter), (iii) and access to the default time-to-live (TTL) value is in layer 3 (L3).

Method 300 enters at block 305, where the optimization component determines if the communication between computing devices (e.g., computing system 110-1 and computing system 110-2) is a long-lived flow. In one embodiment, to determine whether the communication is associated with a long-lived flow, the optimization component may poll the sender at each predetermined time interval (e.g., every x milliseconds (ms)) to determine if the data flow is long lived. That is, the optimization component may check each packet received from the sender and track the duration. If the sender is emitting packets for a predetermined amount of time, then the optimization component may determine that the data flow is a long-lived flow. The predetermined amount of time may be defined by the network administrator (e.g., via the management system 150).

If, at block 305, the optimization component determines that the data flow is long lived, then the method 300 proceeds to block 310, where the optimization component determines whether the computing devices (e.g., sender and receiver) are within a datacenter (e.g., datacenter 160). In one embodiment, the optimization component determines whether the computing devices are within the datacenter, based on the TTL value of a packet within the data flow. For example, the optimization component can check a received packet's TTL value (L3) and determine whether the TTL value satisfies a predetermined condition (e.g., TTL value=TTL maximum value−1). In one embodiment, the predetermined condition being satisfied indicates there has been a single hop, which is indicative of the computing devices being within the datacenter. Thus, if the TTL value does satisfy the predetermined condition, then the optimization component determines that the computing devices (e.g., sender and receiver) are within a data center, and the method proceeds to block 315.

Figure 4:
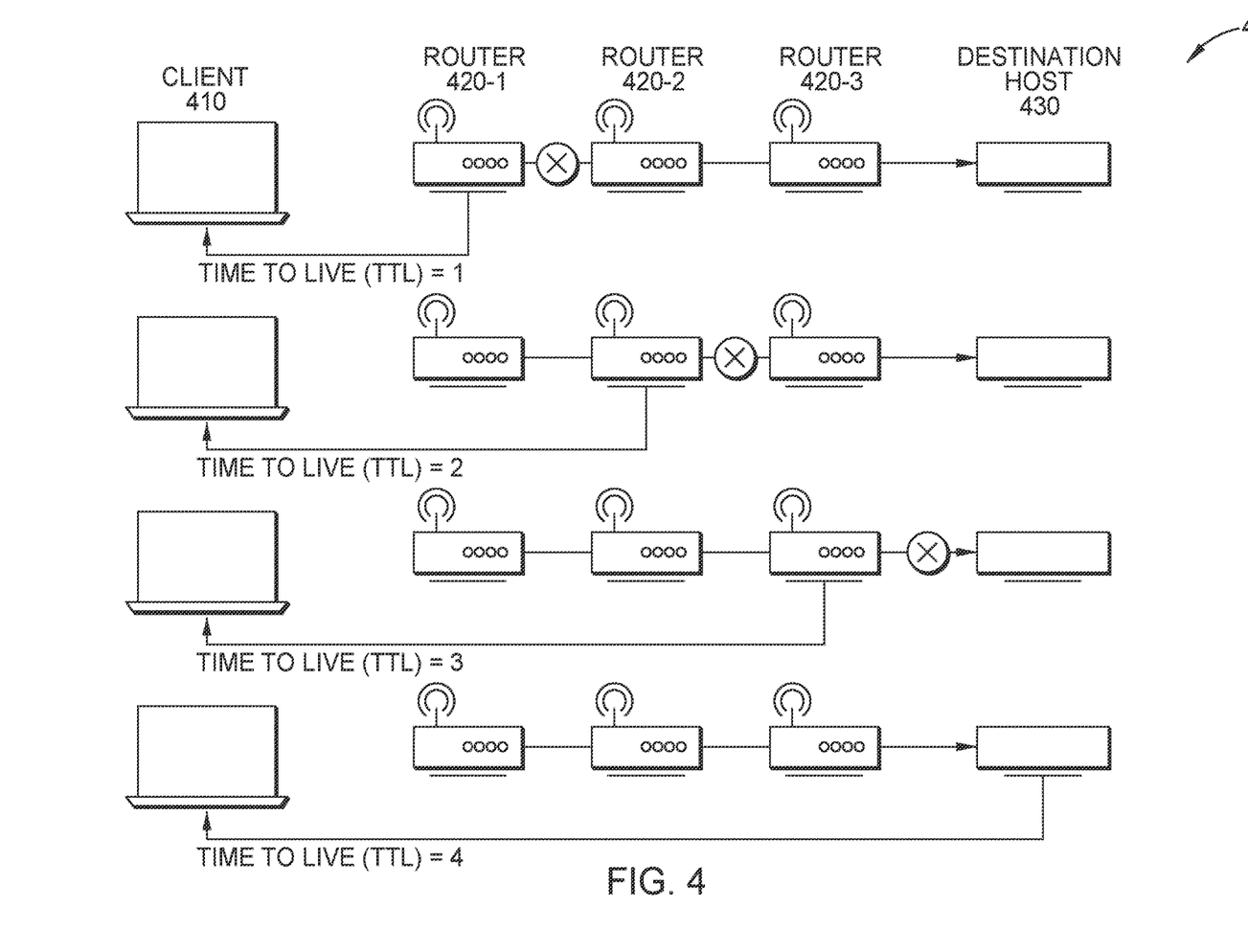
FIG. 4 illustrates an example scenario of determining time-to-live value of a packet, according to one embodiment.

As a reference example, consider the scenario depicted in FIG. 4, which illustrates different TTL values between a client 410 (e.g., sender) and destination host 430 (e.g., receiver). In this scenario, there are three network devices 420 1-3 (e.g., routers) deployed between a client 410 and a destination host 430. Here, when the network device 420-1 checks the packet's TTL from the client 410, the TTL value is equal to "TTL maximum value−1" indicating a single hop has occurred. When the network device 420-2 checks the packet's TTL, the TTL value is equal to "TTL maximum value−2" indicating two hops have occurred. When the network device 420-3 checks the packet's TTL, the TTL value is equal to "TTL maximum value−3" indicating three hops have occurred. Lastly, when the destination host 430 checks the packet's TTL, the TTL value is equal to "TTL maximum value−4" indicating four hops have occurred.

Figure 5:
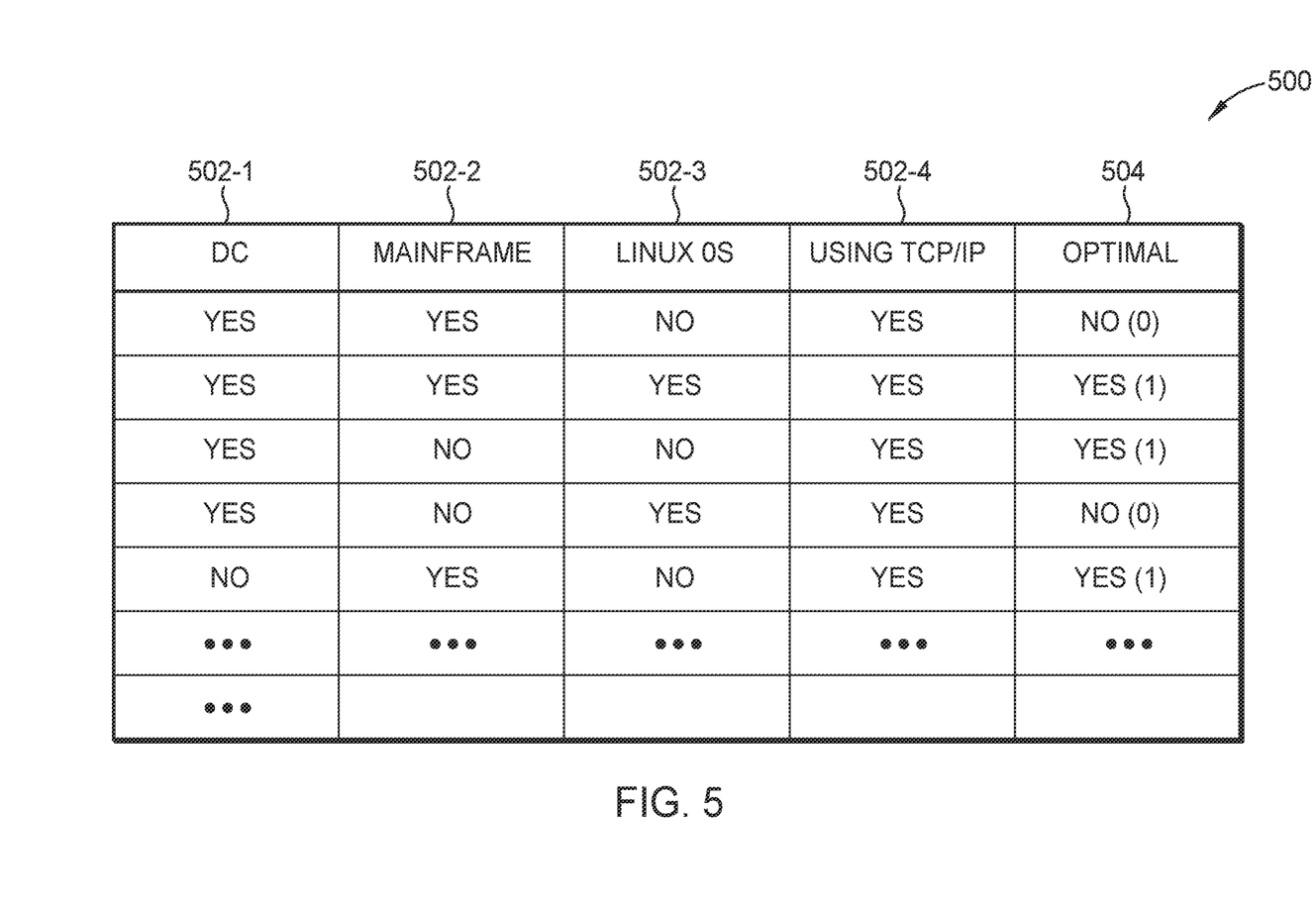
FIG. 5 illustrates an example training data set for training a decision tree model, according to one embodiment.

Referring back to FIG. 3, at block 315, the optimization component determines an optimal communication protocol, based on a decision tree model. The decision tree model may be trained on a dataset that includes various combinations of values for one or more different parameters. For example, FIG. 5 illustrates an example table 500 with training data for training a decision tree model to predict an optimal communication protocol for computing devices within a datacenter. As shown, the table 500 includes different combinations for parameters 502 1-4, and an optimal result indication 504 for a given set of parameters 502. The value for parameter 502-1 indicates whether the computing devices (e.g., sender and receiver) are within a datacenter (DC), where "YES" indicates that the computing devices are within the datacenter and "NO" indicates that the computing devices are not within the datacenter. The value for parameter 502-2 indicates whether the communication is between mainframes, where "YES" indicates that the communication is between mainframes and "NO" indicates that the communication is not within mainframes. The value for parameter 502-3 indicates whether a predefined operating system (OS) (e.g., Linux OS or another OS) is being used by the computing devices, where "YES" indicates that the predefined OS is being used and "NO" indicates that the predefined OS is not being used. The value for parameter 502-4 indicates whether a predefined communication protocol (e.g., TCP/IP) is being used by the computing devices, whether "YES" indicates that the predefined communication protocol is being used and "NO" indicates that the predefined communication protocol is not being used. The value for the optimal result indication 504 indicates whether the predefined communication protocol 502-4 is "optimal" (e.g., meets a target set of criteria), where "NO" and "0" indicate that the predefined communication protocol 502-4 is non optimal and YES" and "1" indicate that the predefined communication protocol 502-4 is optimal.

Note that the parameters 502 indicated in table 500 are reference examples of parameters that can be used to train a decision tree model and that the table 500 may include other parameters. In general, the table 500 can include any set of network-related parameters, non-network related parameters, or combinations thereof for training a decision tree model.

Figure 6:
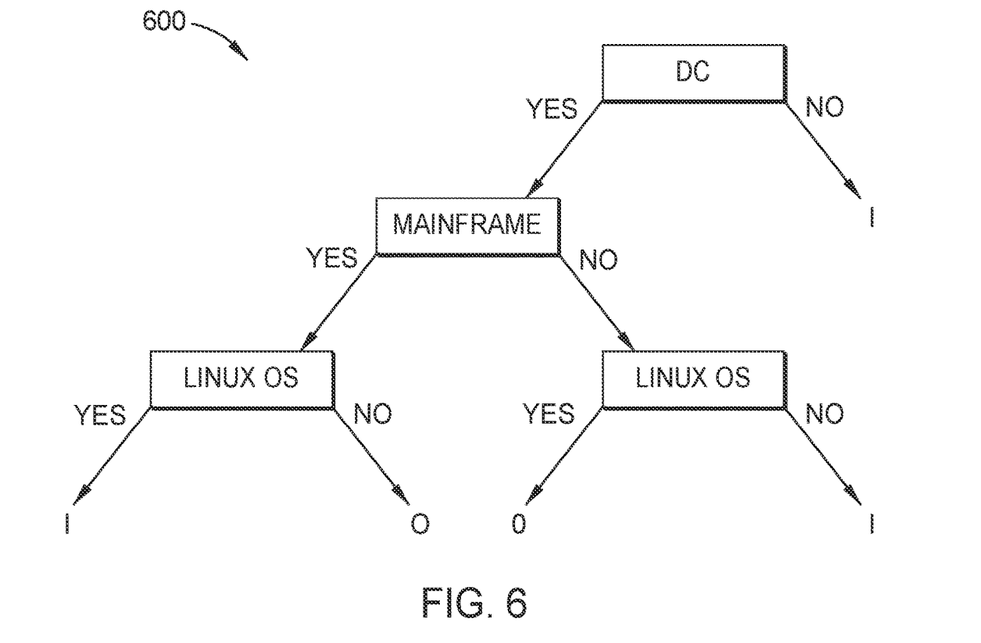
FIG. 6 illustrates an example decision tree model, according to one embodiment.

Referring back to FIG. 3, in one embodiment, the training data within table 500 is used to train the decision tree model used by the optimization component in block 315. For example, the optimization component, in block 315, can traverse the decision tree to determine the optimal communication protocol (e.g., SMC, data center TCP (DCTCP), TCP/IP, and variations thereof) for the computing devices to use for communications. FIG. 6 illustrates a reference example decision tree model 600, which can be used by the optimization component in block 315, according to one embodiment.

At block 320, the optimization component determines an optimal networking stack that will meet a target criteria. The target criteria can include one or more network related objectives, one or more non-network related objectives, or combinations thereof. For example, the target criteria can include at least one of (i) maximizing latency reduction, (ii) minimizing processor overhead, or (iii) maximizing encryption strength. In one embodiment, the optimization component determines the optimal networking stack using another decision tree model. This decision tree model may be trained using one or more network-related parameters, one or more non-network related parameters, or a combination thereof, to determine the networking stack that satisfies the target criteria.

Figure 7:
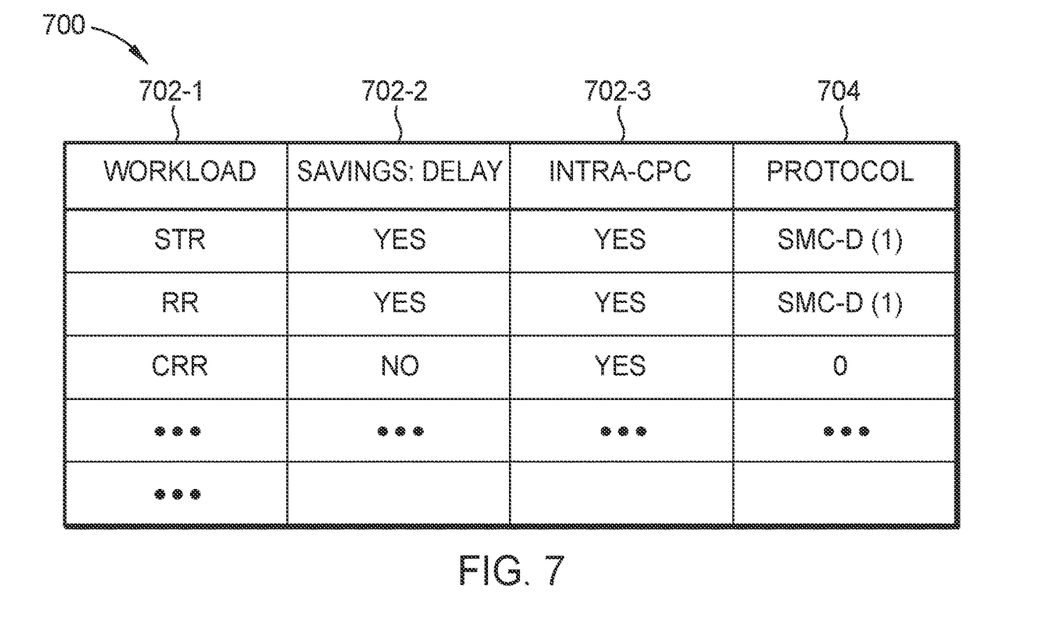
FIG. 7 illustrates another example training data set for training a decision tree model, according to one embodiment.

By way of example, FIG. 7 illustrates an example table 700 with training data for training a decision tree model to predict an optimal networking stack for computing devices within a datacenter. As shown, the table 700 includes different combinations for parameters 702 1-3 and an optimal result indication 704 for a given set of parameters 702. The value for parameter 702-1 indicates the type of workload (e.g., streaming (STR), request and response (RR), and connect-request-response (CRR)). The value for parameter 702-2 indicates whether to minimize the amount of delay, where "YES" indicates to minimize the amount of delay and "NO" indicates to not minimize the amount of delay. The value for parameter 702-3 indicates whether the communication is between mainframes. The value for parameter 704 indicates the optimal networking stack. Here, for example, the parameter 704 indicates SMC Direct Memory Access (SMC-D) is the optimal networking stack when parameter 702-1 is equal to "STR" or "RR", parameter 702-2 is equal to "YES" and parameter 702-3 is equal to "YES."

In certain embodiments, at block 320, the optimization component may use a decision tree model trained with the training data in table 700 to predict the optimal networking stack. At block 325, the optimization component transmits an indication of at least one of the optimal communication protocol or optimal networking stack to a network administrator or operator. In a reference example, if the optimization component determines that the data flow is a streaming flow within a datacenter, then the optimization component can (i) output a recommendation to the network administrator regarding using a more robust protocol sensitive to delay, such as remote direct memory access (RDMA) over Converged Ethernet, version 2 (RoCEv2) or (ii) send a recommendation packet to the sender to autonomously switch protocols. Such a recommendation may be supported by statistics, such as processor savings, reduction in latency, increase in throughput, etc. The statistics can be pre-computed via simulation on another node and then referenced by the optimization component or can be extracted from an external database or storage system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
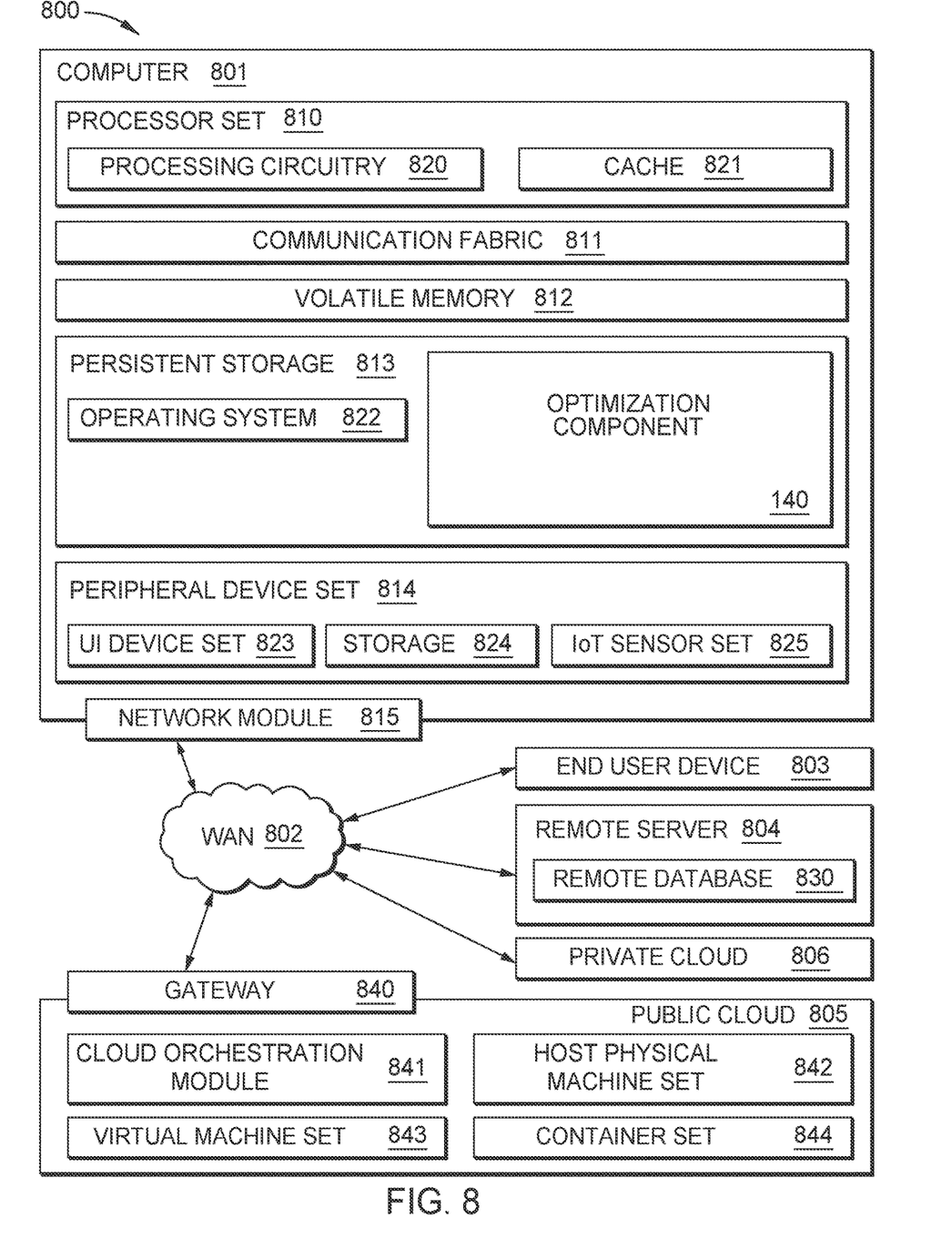
FIG. 8 illustrates an example computing environment, according to one embodiment.

FIG. 8 illustrates a computing environment 800 which contains an example of an environment for the execution of at least some of the computer code involved in performing the inventive methods, such as the optimization component 140 predicting at least one of an optimal networking stack or optimal communication protocol for computing devices to use for communications within a datacenter. In addition to the optimization component 140, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and optimization component 140, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input / output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   determining one or more parameters of a communication between a first computing device and a second computing device;
   predicting at least one of a networking stack or a communication protocol that will meet a target set of criteria for the communication, based on evaluating the one or more parameters with at least one machine learning model; and
   transmitting an indication of at least one of the networking stack or the communication protocol.

2. The computer-implemented method of claim 1, wherein determining the one or more parameters comprises determining whether the communication between the first computing device and the second computing device is a long-lived flow.

3. The computer-implemented method of claim 2, wherein the communication is determined to be a long-lived flow when a duration of the communication is greater than a predefined amount of time.

4. The computer-implemented method of claim 1, wherein determining the one or more parameters comprises determining whether the first computing device and the second computing device are within a datacenter.

5. The computer-implemented method of claim 4, wherein determining whether the first computing device and the second computing device are within the datacenter comprises determining whether a time-to-live value of a packet within the communication is equal to a predefined value.

6. The computer-implemented method of claim 5, wherein the first computing device and the second computing device are determined to be within the datacenter when the time-to-live value of the packet is equal to the predefined value.

7. The computer-implemented method of claim 1, wherein the at least one machine learning model comprises a first decision tree model and a second decision tree model.

8. The computer-implemented method of claim 7, wherein the networking stack is predicted based on evaluating the one or more parameters with the first decision tree model.

9. The computer-implemented method of claim 7, wherein the communication protocol is predicted based on evaluating the one or more parameters with the second decision tree model.

10. The computer-implemented method of claim 1, wherein the target set of criteria comprises at least one of (i) minimizing processor overhead, (ii) minimizing latency, or (iii) maxising throughput.

11. The computer-implemented method of claim 1, wherein the one or more parameters comprise at least one of (i) one or more network-related parameters or (ii) one or more non-network related parameters.

12. A system comprising:
   a processor; and
   a memory, wherein the memory includes a computer program product configured to perform an operation comprising:
      determining one or more parameters of a communication between a first computing device and a second computing device;
      predicting at least one of a networking stack or a communication protocol that will meet a target set of criteria for the communication, based on evaluating the one or more parameters with at least one machine learning model; and transmitting an indication of at least one of the networking stack or the communication protocol.

13. The system of claim 12, wherein determining the one or more parameters comprises determining whether the communication between the first computing device and the second computing device is a long-lived flow.

14. The system of claim 12, wherein determining the one or more parameters comprises determining whether the first computing device and the second computing device are within a datacenter.

15. The system of claim 14, wherein determining whether the first computing device and the second computing device are within the datacenter comprises determining whether a time-to-live value of a packet within the communication is equal to a predefined value.

16. The system of claim 12, wherein the at least one machine learning model comprises a first decision tree model and a second decision tree model.

17. The system of claim 16, wherein the networking stack is predicted based on evaluating the one or more parameters with the first decision tree model.

18. The system of claim 16, wherein the communication protocol is predicted based on evaluating the one or more parameters with the second decision tree model.

19. The system of claim 12, wherein the one or more parameters comprise at least one of (i) one or more network-related parameters or (ii) one or more non-network related parameters.

20. A computer-readable storage medium having computer-readable program code embodied therewith, the computer-readable program code executable by one or more computer processors to perform an operation comprising:

determining one or more parameters of a communication between a first computing device and a second computing device;

predicting at least one of a networking stack or a communication protocol that will meet a target set of criteria for the communication, based on evaluating the one or more parameters with at least one machine learning model; and transmitting an indication of at least one of the networking stack or the communication protocol.

* * * * *